United States Patent [19]
Eldridge

[11] Patent Number: 5,956,894
[45] Date of Patent: Sep. 28, 1999

[54] TREE INJECTION APPARATUS

[76] Inventor: Geoffrey Richard Eldridge, 35B Viewland Drive, Noosa Heads, Queensland, 4567, Australia

[21] Appl. No.: 08/973,453

[22] PCT Filed: May 23, 1996

[86] PCT No.: PCT/AU96/00312

§ 371 Date: Dec. 1, 1997

§ 102(e) Date: Dec. 1, 1997

[87] PCT Pub. No.: WO96/38033

PCT Pub. Date: Dec. 5, 1996

[30] Foreign Application Priority Data

May 30, 1995 [AU] Australia ................................ PN3228
Jul. 26, 1995 [AU] Australia ................................ PN4377

[51] Int. Cl.⁶ .............................................. A01G 7/06
[52] U.S. Cl. ........................................................ 47/57.5
[58] Field of Search ............................. 47/57.5; 118/35; 408/59, 57; 175/393

[56] References Cited

U.S. PATENT DOCUMENTS

| | | | |
|---|---|---|---|
| 1,718,195 | 6/1929 | Rankin | 47/57.5 |
| 1,734,672 | 11/1929 | Harralson | 408/59 |
| 1,756,453 | 4/1930 | Davey et al. | 427/291 |
| 1,982,974 | 12/1934 | Aiken | 427/291 |
| 1,982,975 | 12/1934 | Aiken | 427/291 |
| 2,821,944 | 2/1958 | Blake | 118/407 |
| 3,295,254 | 1/1967 | Schoonman | 47/57.5 |
| 3,415,612 | 12/1968 | Rosenberg | 427/291 |
| 3,596,402 | 8/1971 | Palmer | 47/53 |
| 3,640,234 | 2/1972 | Carroll et al. | 111/6 |
| 3,832,803 | 9/1974 | Blake et al. | 47/57.5 |
| 3,834,075 | 9/1974 | Nix et al. | 47/57.5 |
| 3,968,594 | 7/1976 | Kawakami | 47/57.5 |
| 4,011,685 | 3/1977 | Boyd et al. | 47/57.5 |
| 4,029,134 | 6/1977 | Cook et al. | 144/208 |
| 4,048,353 | 9/1977 | Stewart et al. | 427/291 |
| 4,103,456 | 8/1978 | Hendrixson et al. | 47/57.5 |
| 4,176,495 | 12/1979 | Dale | 47/57.5 |
| 4,596,088 | 6/1986 | Graber | 47/57.5 |
| 5,046,281 | 9/1991 | Murphy | 47/57.5 |
| 5,092,717 | 3/1992 | Fischer | 408/59 |
| 5,114,032 | 5/1992 | Laidlaw | 215/356 |
| 5,447,397 | 9/1995 | Asano | 408/59 |
| 5,478,394 | 12/1995 | Bidaux | 118/407 |
| 5,620,516 | 4/1997 | Helsing et al. | 118/407 |
| 5,797,215 | 8/1998 | Doolittle et al. | 47/57.5 |

FOREIGN PATENT DOCUMENTS

| | | | |
|---|---|---|---|
| 0111254 | 6/1984 | European Pat. Off. | 47/57.5 |
| 0187 124 | 7/1986 | European Pat. Off. | |
| 2367424 | 5/1978 | France | 47/57.5 |
| 686 768 | 6/1996 | Switzerland | |

OTHER PUBLICATIONS

PCT International Search Report, dated Jul. 31, 1996.

Primary Examiner—Thomas Price
Assistant Examiner—Fredrick T. French, III
Attorney, Agent, or Firm—Knobbe, Martens, Olson & Bear LLP

[57] ABSTRACT

Apparatus and methods for injecting a fluid into tissue of a plant are described. In one embodiment, the apparatus (1) comprises a spindle (2) which rotates within a fluid delivery manifold (3). The spindle can be driven by an electric drill and the spindle has a threaded portion (4) for insertion into the plant. In another embodiment, the apparatus includes a pump barrel which in conjunction with the spindle allows the apparatus to be used as a syringe. Methods of delivering fluid to plant tissue using apparatus according to the invention are also described.

50 Claims, 8 Drawing Sheets

TREE INJECTION APPARATUS

TECHNICAL FIELD

This invention relates to an improved method and apparatus for treatment of plants and in particular injection of chemical solutions and fluids into plants.

BACKGROUND ART

Plants such as trees are susceptible to various diseases and afflictions which may be treated by appropriate treatment fluids including nutrients, insecticides, fungicides, growth hormones, regulators and the like. In some cases, such treatment chemicals can be applied to the soil where the roots are located or sprayed onto the leaves of the plant.

Such methods can be inefficient and are environmentally undesirable in that run-off of treatment fluids can pollute surrounding land or water systems. It is generally more efficient to administer a treatment fluid to a plant such as a tree by directly inoculating the trunk or branches of the tree and many different injection methods have been developed for this purpose. Direct injection of a treatment fluid into plant tissue also poses less of an environmental hazard.

Tree injection devices are known and are described, for example, in U.K. Patent No. 2234148 which discloses a closed plastics tube filled with treatment fluid and having a drivable end closure with a line of weakness. In U.S. Pat. No. 4,896,454 there is described an inclined tube secured by a bracket to a tree trunk with a first resilient bushing located in the tube lower end and sealed with a second bushing located in the tube upper end and sealing the upper end. Liquid can be injected into the tree by a hypodermic needle which is passed through the upper end bushing. In U.K. Patent No. 2213032 there is described a method for injecting a tree with a liquid chemical which uses an injection tube and flexible container to feed the chemical at a low pressure. The container is made in the form of an elastic tube which is filled with the liquid chemical and attached by one end to the injection tube with the other end closed. In U.S. Pat. No. 4,698,935 and No. 4,766,659 there is described a tree injector inserted through a mass of sealable material such as a silicone which is carried by the rearward end portion of the cartridge and accessible externally thereof. In Australian Patent No. 608767 there is described an injector for use in the subcutaneous injection of fluid into a plant which is of a syringe-like configuration including an outlet nozzle and a plunger reciprocally slidable in an internal chamber of the injector. In Australian Patent Application No. 74861/87, there is described a tree dosing device having a moveable piston actuated by a trigger comprising a blade and a fluid injector. French Patent No. 2422322 refers to a ligneous plant injection system with fluid delivered by a syringe or tube pressed into sapwood.

U.S. Pat. No. 4,164,093 described an injector for branches of tress having a self locking wrench used to clamp a disposable syringe tip against a branch. In U.S. Pat. No. 4,011,685 there is described a tree injection system comprising a syringe including a barrel with an axially slidable piston and piston rod. A transverse bore leads into the barrel from a reservoir which extends vertically above the barrel. When the piston is fully withdrawn, liquid from the reservoir enters the barrel. When the piston is advanced, the transverse bore is sealed off while the liquid in the barrel is discharged via a needle at one end of the barrel. A check valve is included adjacent the needle.

A tree treatment capsule is described in Australian Patent No. 594875. The capsule is insertable as a unit into a bore of a tree and is frangible so that upon application of an impact force chemical agent contained within the capsule can mix with the sap of the tree. Australian Patent No. 570799 describes a plant treatment means comprising an unpressurised reservoir intended to contain a plant treatment agent and adapted to be fixed to a plant stem and having at least one probe able to penetrate the epidermis of the plant.

The main disadvantages of the prior art referred to above is that they provide limited sealing between the injection device and the tree tissue, thereby severely limiting injection pressure and consequently providing relatively slow injection rates. Furthermore, most if not all of the prior art devices seal against the phloem tissue (soft growth) and expose the cambium layer to the injected chemicals and hydraulic pressure. This can cause hydraulic separation of the cambium and phloem layers from the xylem and enough physical and chemical damage to kill large sections of the cambium and phloem around the injection sight.

None of the prior art provides the ability to inject multiple chemical solutions via the same hole without significant time delays and consequent increased costs.

SUMMARY OF THE INVENTION

It is an object of the present invention to provide a method and apparatus for delivering a fluid into tissue of a plant which may overcome, or at least alleviate, the above-mentioned disadvantages of the prior art.

According to a first embodiment of the invention, there is provided an apparatus for delivering a fluid into tissue of a plant, said apparatus comprising a spindle rotatable within a fluid delivery manifold positioned between first and second end portions of said spindle, said spindle having an external thread extending from said first end towards said fluid delivery manifold, said fluid delivery manifold including at least one fluid inlet which is in fluid communication with a passage through said spindle and which has at least one outlet in the threaded portion of the spindle or at the first end thereof; wherein said spindle can be rotated by drive means connected to said second end of said spindle. According to a second embodiment of the invention, there is provided a method of delivering a fluid into tissue of a plant, said method comprising the steps of:

1) forming a passage in the trunk or a branch of said plant which extends at least partially into the xylem;
2) driving an apparatus according to the first embodiment into said passage with threaded engagement between said first end portion of the apparatus spindle and plant tissue to effect a fluid seal between said at least one apparatus passage outlet and the exterior of said plant;
3) delivering fluid to said plant under pressure via said fluid delivery manifold and said apparatus passage; and
4) removing said apparatus from said passage in said plant.

According to a third embodiment of the invention, there is provided an apparatus for delivering a fluid into tissue of a plant, said apparatus comprising:

a spindle rotatable within a fluid delivery manifold positioned between first and second end portions of said spindle;

a pump barrel which threadingly engages said spindle first end and is axially movable with respect thereto between retracted and extended positions, said pump barrel having an externally threaded spout the axis of which is aligned with the axis of said spindle, said spout having associated therewith a valve which prevents back flow of fluid into said pump barrel;

a lock for retaining said pump barrel in said extended position and preventing movement of said pump barrel with respect to said spindle first end; and at least one fluid inlet in said fluid delivery manifold which is in fluid communication with the interior of said pump barrel via a passage through said spindle, said at least one fluid inlet having associated therewith a valve for preventing back flow of fluid from said fluid delivery manifold;

wherein, said spindle can be rotated by drive means connected to said second end of said spindle.

According to a fourth embodiment of the invention, there is provided a method of delivering a fluid into tissue of a plant, said method comprising the steps of:

1) forming a passage in the trunk or branch of said plant which extends at least partially into the xylem;
2) driving an apparatus according to the third embodiment into said passage with threaded engagement between said pump barrel spout and plant tissue to effect a fluid seal between said spout outlet and the exterior of said plant, wherein said pump barrel is in said extended position and is charged with fluid;
3) delivering fluid to said plant under pressure by moving said pump barrel to said retracted position via rotation of said spindle; and
4) removing said apparatus from said passage in said plant.

The fluid delivery manifold of apparatus according to the first embodiment is typically an annulus within an annular channel formed in the spindle. The at least one inlet is located in the annulus and the channel is free to rotate with respect to the annulus. The channel is advantageously formed by providing a stepped boss, the smaller diameter portion of which forms the bottom of the channel. A second annulus, locked to the spindle or the smaller diameter portion of the stepped boss and abutting the first annulus, can then be used to form the other side of the channel.

Seals are typically provided between the fluid delivery manifold and the spindle to prevent egress of fluid to the exterior of the apparatus other than through the passage through the spindle. To facilitate flow of fluid from the at least one inlet of the fluid delivery manifold to the passage, a channel can be provided on the inside surface of the fluid delivery manifold, or on the exterior of the spindle, which channel is in fluid communication with the at least one inlet.

The threaded first end portion of the spindle of apparatus according to the first embodiment is typically of sufficient length to extend from the exterior of the plant to at least the outer extremity of the xylem. While this distance will vary with different species of plants, a length of about 3 to 10 cm is suitable for use with most trees. The thread of the first end portion is advantageously a standard-type thread to facilitate engagement between the spindle of the apparatus and tissue of the plant when the apparatus is driven into a passage formed in the plant. The thread can be straight or tapered although a straight thread is preferred.

The second end portion of the spindle is typically a cylindrical shaft which can be fitted into the chuck of a drive means. The preferred drive means is a reversible electric drill powered by a rechargeable battery pack. It will be appreciated however that the drive means and apparatus can be an integral unit with, for example, a DC electric motor directly coupled to the second end portion of the apparatus.

Fluid from a source thereof is typically delivered to the fluid delivery manifold by a pump via a conduit. The conduit is advantageously flexible. To facilitate connection of the conduit to the inlet of the fluid delivery manifold, a connector can be provided. The connector is typically a threaded nipple. The inlet or connector can include a non-return valve to prevent back-flow of fluid.

While apparatus according to the invention typically include a single inlet in the fluid delivery manifold, the manifold can have a plurality of inlets. This allows simultaneously delivery of two or more fluids in cases where premixing of the two different fluids is undesirable or inconvenient.

Where the apparatus and drive means are independent units, a brace is advantageously provided to prevent rotation of the fluid delivery manifold when the spindle is being driven. The brace typically extends from the manifold to a point where it can be fixed to the drive means when connected to the second end portion of the spindle.

In embodiments where the spindle passage has a single outlet, the passage is typically a circular bore from the first end of the spindle along the axis thereof with a return at the end of the passage opposite the outlet for communication between the fluid delivery manifold and the passage. In this form of the apparatus, fluid exits the passage axially.

However, the passage can branch to form two or more outlets and in an alternative embodiment of the invention, two diametrically opposed outlets are provided part-way along the threaded first end portion of the spindle. Fluid thus exits the passage radially. This embodiment is particularly advantageous for delivery of fluid into a particular type of plant tissue, such as the cambium or phloem.

Apparatus having passage outlets for radial exiting of fluid advantageously include an internally threaded ferrule which can be screwed along the threaded portion of the spindle. The ferrule acts as a depth control so that the passage outlet or outlets can be accurately positioned in the desired type of plant tissue.

In the method according to the second embodiment of the invention, the passage in the plant can be formed using a drill and bit, a brace and bit, or any other suitable wood-boring tool. However, the invention also provides a drill-bit or wood-borer holder which can be used in conjunction with apparatus according to the invention. The holder comprises a sleeve which can be fitted over the first end portion of an apparatus spindle and locked thereto. The distal end of the holder has an axial recess for receiving the shank of a drill bit or wood borer and means for locking the bit or borer into the recess. When fitted to an apparatus, the holder and associated bit or borer allows a passage to be formed in the plant by rotating the apparatus with the drive means. The holder can then be removed from the apparatus for use of the latter in the fluid delivery operation.

In step (2) of the method, the apparatus is typically driven into a plant at a speed of 100 to 400 rpm. The threaded engagement between the apparatus spindle and plant tissue, and extension of the spindle through to the xylem, maintains the integrity of tissue such as the cambium and phloem thus allowing fluid to be delivered at higher pressure than is possible with prior art devices.

The optimal pressure used for fluid delivery is dictated by the structural characteristics of the tissue of the plant into which the fluid is to be injected. Using avocado trees as an example, a pressure of 600 to 700 psi (4,000 to 4,900 kPa) is preferably used for fluid delivery.

Following removal of the apparatus after fluid delivery to the plant—step (4) of the method—the method preferably includes the further step of plugging the passage in the plant. Plugging the passage prevents short, medium or long term leakage of fluid from the plant, such fluid including the delivered fluid as well as natural tree fluids such as sap. Plugging also promotes rapid healing over the passage.

Any tight fitting plug impervious to tree fluids and delivered fluids can be used for plugging the passage in the plant. However, the invention also provides plugs which can be used for this purpose. Such plugs are typically elongate cylindrical members having at least one chamfered end. Alternatively, one of the ends can be externally flanged, the flange acting as a stop when the plug is driven into the passage.

A particularly preferred plug has a plurality of annular barbs along the length thereof. Yet another preferred plug according to the invention has an external thread similar to the thread of the apparatus spindle. The threaded plug can then be screwed into the thread in the plant passage formed by the apparatus, although coincidence of the threads is not essential. To facilitate insertion of a threaded plug, an axial stem can be provided which can be held as a transitional fit in a recess in an apparatus spindle. The recess is advantageously the fluid delivery passage in embodiments where the passage has an outlet for axial exiting of fluid. Insertion of a threaded plug can be further facilitated by providing a diametric web at the end of the plug contiguous with the stem. The web can be received in a slot provided in the end of an apparatus spindle.

It will be appreciated that the method according to the second embodiment of the invention can use apparatus according to the first embodiment having all of the preferrments and alternative features discussed above.

Apparatus according to the third embodiment provides a "single shot" fluid delivery apparatus. The pump barrel and first end portion of the spindle in essence comprise a syringe. Movement of the pump barrel from the retracted to the extended position charges the pump barrel with fluid supplied via the fluid delivery manifold. Movement of the pump barrel from the extended to the retracted position effects expulsion of the fluid charge from the pump barrel via the spout.

Typically, the spindle first end in threadingly engaged within the pump barrel so that the first end acts as a piston or plunger and the pump barrel acts as a cylinder or syringe body. The spindle first end in this case is externally threaded for a sufficient distance to allow movement of the pump barrel between the extended and retracted positions. The threaded engagement between the pump barrel and external thread on the spindle can be via an internally-threaded internal flange at the end of the pump barrel or adjacent thereto, this end being opposite to the spout end. An external flange is also advantageously provided at the end of the spindle first end, which flange can include at least one O-ring seal. The pump barrel internal flange and spindle external flange can abut when the barrel is in the extended position thereby preventing separation of the barrel and spindle.

It will be appreciated, however, that apparatus according to the third embodiment can comprise a pump barrel and spindle where the threaded engagement therebetween is via an internal thread extending an appropriate distance into said pump barrel and a complementary externally-threaded external flange at the end of the spindle. Furthermore, movement of the pump barrel can be internally of the spindle, the spindle first end in this format being essentially a sleeve.

It will be appreciated that the spout of apparatus according to the third embodiment functions in the same manner as the externally-threaded first end portion of the spindle of apparatus according to the first embodiment. In this regard, it should be noted that the spout can take the form of all the preferments and variants of the first end portion of the first embodiment apparatus. Furthermore, the spout end of the pump barrel of apparatus according to the third embodiment can be adapted to receive a drill-bit or wood-borer holder as described above.

The locking means of apparatus according to the third embodiment can be any means which locks the pump barrel to the spindle so that the two rotate in unison when rotary movement is imparted on the spindle. Typically, the locking means is a slip-ring or sleeve which can be moved between positions which effect locking between the pump barrel and spindle or allow independent rotation of the two. Slip-rings or sleeve arrangements can incorporate interdigitating elements, such as a key and corresponding key-way, or be irregularly shaped and complementary to the portion of the apparatus which receives the slip-ring or sleeve in locked mode. With regard to the latter form of slip-ring or sleeve, it should be noted that the exterior surfaces of the apparatus in the locking means region can be of any cross-sectional shape, including circular, ovoid, or rectangular.

The fluid delivery manifold and adjacent region of the spindle of apparatus according to the third embodiment are essentially the same as these features of apparatus according to the first embodiment. Indeed, all preferments and variants of features of apparatus according to the first embodiment are applicable to equivalent features of apparatus according to the third embodiment.

Concerning the method according to the fourth embodiment of the invention, the steps involved are carried out in generally the same manner as the method of the second embodiment and include all relevant variations and preferments of the latter. However, it will be appreciated that an auxiliary fluid supply pump is not required in conjunction with the method according the fourth embodiment as the apparatus per se provides a pumping action. Sufficient pressure for injecting fluid into tissue of a plant is provided with the apparatus by virtue of the following relationship:

$$P_1 = \frac{T \times P_2 \times 2\Pi}{A}$$

where $P_1$ is the pressure at which the fluid is delivered, T is the maximum torque of the drive means, $P_2$ is the threads per unit distance of the threaded portion of the pump barrel or spindle, and A is the area of the apparatus component providing the piston effect.

However, it will be appreciated that where a variable speed drive means is used, the pressure of fluid exiting the apparatus can be controlled by the speed of the drive means. It will also be appreciated that a pump can be used for delivering fluid to the manifold, particularly when viscous fluids are delivered to a plant.

Methods and apparatus according to the invention can be used to deliver fluids to a plant having a trunk and/or branches of sufficient size that will not lose structural integrity through application of the method. The method is particularly suited for use with trees. The simplicity of the method allows a different delivery site to be used when a further fluid delivery is required. This eliminates problems generated through repeated fluid delivery at a single site.

The methods and apparatus can be used for delivering any fluid comprising compounds used in plant growth treatment or disease control. Such compounds include, but are not restricted to, plant growth factors, minerals, fertilisers, insecticides, herbicides, fungicides, anti-viral agents and the like. A fluid can comprise a solvent and a solute or solutes, or can be a liquid treatment chemical.

Apparatus according to the invention can be fabricated from any suitable material but is preferably fabricated from a material which is resistant to the fluids with which the apparatus is to be used. A preferred material is a metal such as stainless steel.

Plugs are typically fabricated from a plastics material such as polyethylene or polypropylene.

Having broadly summarised the invention, specific examples will now be given with reference to the accompanying drawings briefly described hereafter.

BRIEF DESCRIPTION OF THE DRAWINGS

In the drawings, like items are identically numbered. The same scale is used in the following sets of drawings: FIGS. 1 to 5; FIGS. 6 to 11; FIGS. 12 to 18; FIGS. 19 and 20; FIGS. 21 to 25; and, FIGS. 26 and 27.

BEST MODE AND OTHER MODES OF CARRYING OUT THE INVENTION

Figure 1:
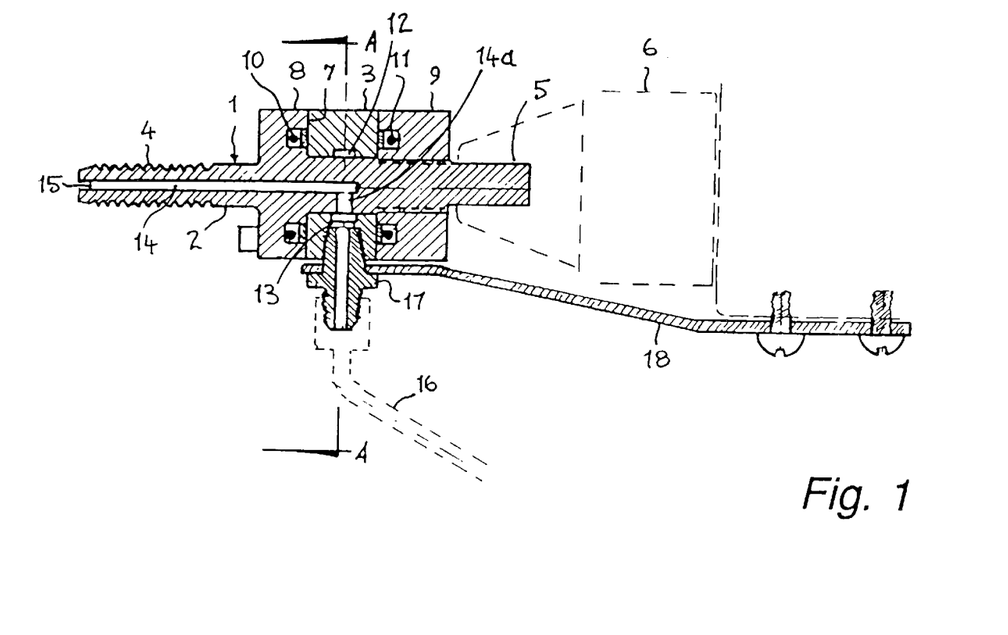
FIG. 1 is a cross-sectional view of an apparatus according to the invention.

Referring first to FIG. 1, there is shown apparatus 1 comprising spindle 2 and fluid delivery manifold 3. Spindle 2 includes threaded first end portion 4, and second end portion 5 which is clamped into the chuck 6, shown in outline, of an electric drill (not shown).

Fluid delivery manifold 3 is an annulus which is located within a channel 7 formed by a stepped boss 8 and annular member 9. Annular member 9 is secured to spindle 2 as an interference fit. High pressure ring seals 10 and 11 are provided between manifold 3 and the walls of channel 7.

The interior of fluid delivery manifold 3 includes a channel 12 through which fluid can communicate between an inlet 13 the manifold, and a passage 14 and interconnecting passage 14a in spindle 2. The substantial portion of passage 14 is an axial bore having an outlet 15.

Connection of a flexible conduit, shown in outline at 16, to the manifold is via a nipple 17. Nipple 17 also serves to secure a brace 18 to apparatus 1, the other end of which is secured to the drill used for driving the apparatus.

Figure 2:
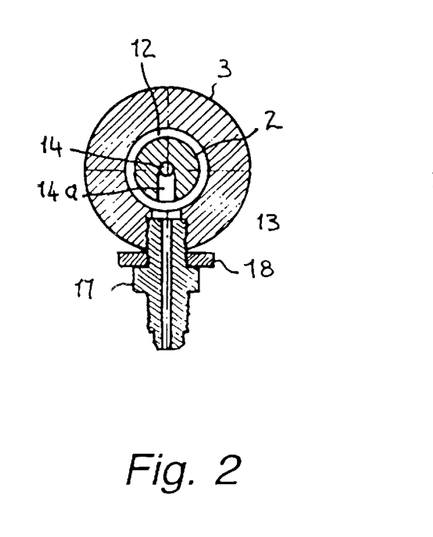
FIG. 2 is a cross-sectional view of the apparatus shown in FIG. 1 at plane A—A.
Figure 3:
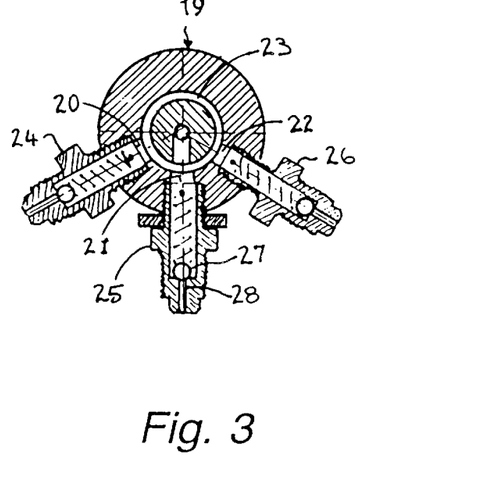
FIG. 3 is a cross-sectional view of another apparatus according to the invention at a plane equivalent to A—A of FIG. 1.

Fluid delivery manifold portions of apparatus according to the invention are shown in FIGS. 2 and 3. As noted above, the former figure is a cross-section at A—A of the apparatus shown in FIG. 1, while FIG. 3 is a cross-sectional view at a plane equivalent to A—A of an alternative apparatus according to the invention.

In FIG. 2, fluid delivery manifold 3 can be seen around spindle 2. Channel 12 in manifold 3, passage 14 in spindle 2, inlet 13, nipple 17 and brace 18 are also shown.

It can be appreciated from FIG. 2 that irrespective of the position of inlet 13 with respect to interconnecting passage 14a, channel 13 allows fluid communication between the inlet and passage 14.

FIG. 3 shows the fluid delivery manifold 19 of an apparatus which in all other aspects is essentially the same as the apparatus depicted in FIGS. 1 and 2. The manifold depicted in FIG. 3 has three inlets 20, 21 and 22 supplying channel 23. Nipples 24 to 26 are provided at each of inlets 20 to 22, respectively. Each nipple has a non-return valve. Referring to nipple 25 as an example, the non-return valve comprises a spring-loaded ball 27 which seats against an end of inlet 28 to the nipple.

The multiple inlets of manifold 19 allows different fluid sources to be connected to an apparatus including such a manifold. The non-return valves prevent egress of fluid in the event that supply lines are not connected to every nipple.

Figure 4:
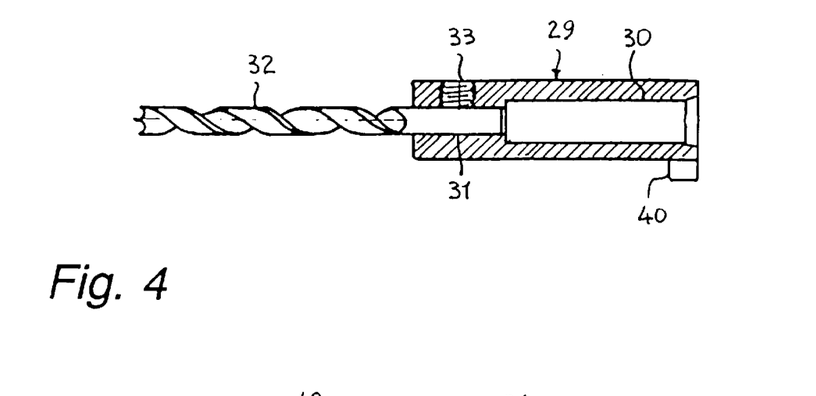
FIG. 4 is a side view in partial cross-section of a drill bit adaptor for use in conjunction with apparatus according to the invention.

Turning now to FIG. 4, there is shown a drill-bit holder 29 for use in conjunction with apparatus according to the invention. Holder 29 has a sleeve portion 30 which can fit over the threaded portion of an apparatus spindle such as that shown in FIG. 1. The holder also has a cylindrical recess 31 for receiving bit 32. A threaded hole 33 is provided for a grub-screw or the like (not shown) for locking bit 32 into the holder. A lip can also be provided at the internal end of recess 31 to act as a stop for bit 32.

Holder 29 is locked to an apparatus for drilling purposes by a tab 34 having a notch therein which receives a lug such as lug 35 of the apparatus shown in FIG. 1.

Figure 5:
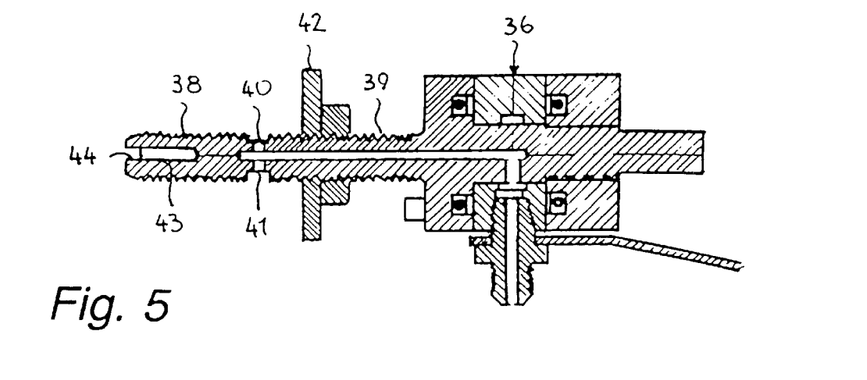
FIG. 5 is a cross-sectional view of another apparatus according to the invention.

Another apparatus according to the invention is shown in FIG. 5. Apparatus 36 has a spindle 37 with an extended first end portion 38. Passage 39 has two outlets 40 and 41 to provide radial exiting of fluid from the apparatus. A ferrule 42 having a threaded bore complementary to the thread of end portion 38 can be moved along the spindle to act as a variably positionable stop. The extreme end of first end 38 includes a blind bore 43 for receiving the stem of a plug and a slot 44 for receiving a webbed plug. The stem and web features of plugs will be described in greater detail below. Other features of the apparatus depicted in FIG. 4 are essentially the same as apparatus 1 of FIG. 1.

Figure 6:
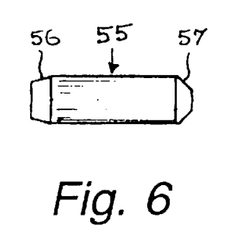
FIGS. 6 to 9 are side views or a cross-sectional view of plugs used in conjunction with the method of the invention.
Figure 7:
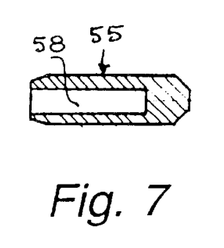

A number of plugs suitable for plugging a passage formed in a plant in performing the method of the invention are shown in FIGS. 6 to 11. FIG. 6 shows a simple cylindrical plug 55 having chamfered ends 56 and 57. The same plug is shown in cross-section in FIG. 7 from which it can be appreciated that plug 55 has a blind bore 58.

Figure 8:
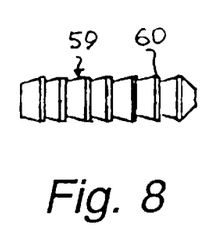

FIG. 8 shows a plug 59 similar to that shown in FIG. 6 save that plug 59 has a plurality of annular barbs, or buttressed ridges, one of which is indicated at 60.

Figure 9:
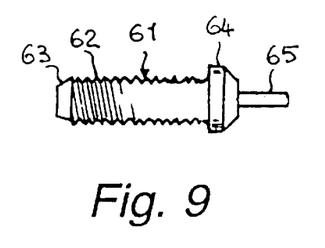

A threaded plug 61 is depicted in FIG. 9. Thread 62 extends from chamfered end 63 to the other end of the plug which has an external flange 64. Plug 61 also includes an axially extending stem 65. Stem 65 can be received as a transitional fit in a passage in an apparatus according to the invention for insertion of the plug into a passage in a plant.

Figure 10:
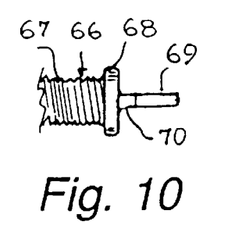
FIG. 10 is a side view of part of a plug used in conjunction with the method of the invention.

An alternative form of threaded plug is shown in part in FIG. 10. Plug 66 has a thread 67 along the length thereof plus an external flange 68 and axially extending stem 69. A substantially diametric web 70 is contiguous with flange 68 and stem 69.

Figure 11:
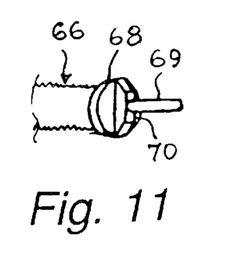
FIG. 11 is a perspective view of the end of the plug shown in FIG. 10.

The web portion 70 of plug 66 can be better appreciated in FIG. 11 where flange 68 and stem 69 can also be seen.

For use with plugs like plug 66 of FIGS. 10 and 11, apparatus according to the invention can include a slot diametrically positioned with respect to the passage provided in an apparatus spindle for receiving the stem of a plug. Such a slot is shown at 71 of FIG. 1.

Figures 12, 13:
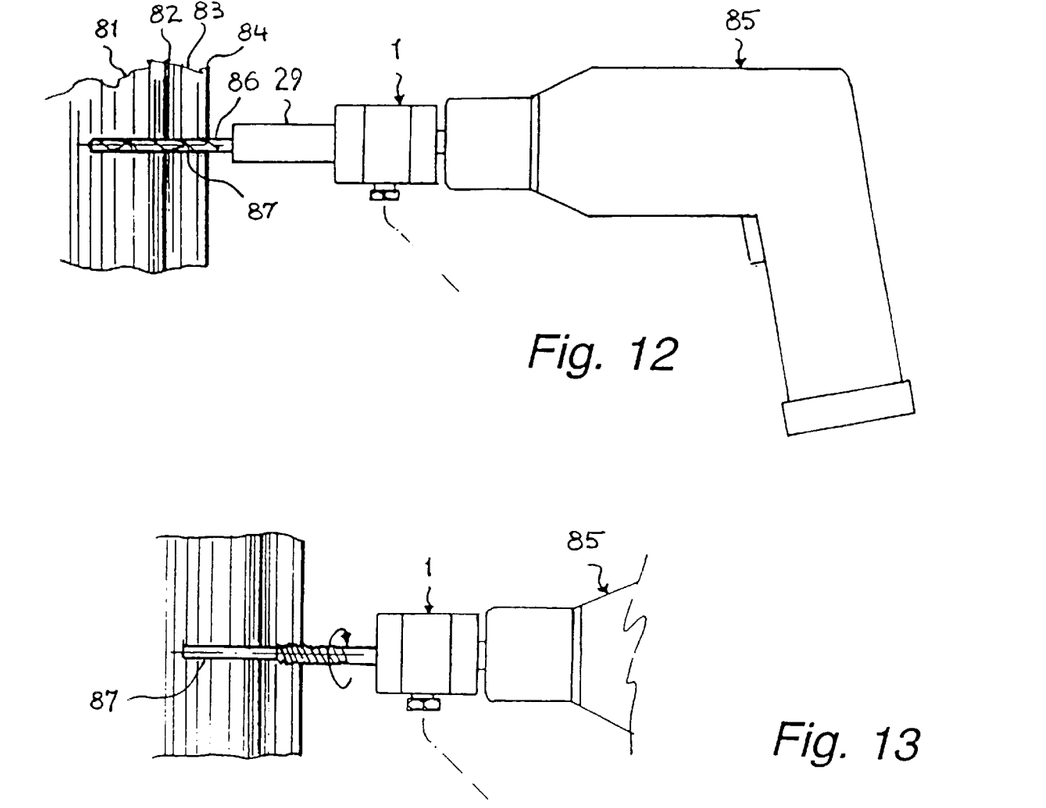
FIGS. 12 to 18 illustrate application of apparatus according to the invention in delivering fluid to tissue of a tree.
Figure 14:
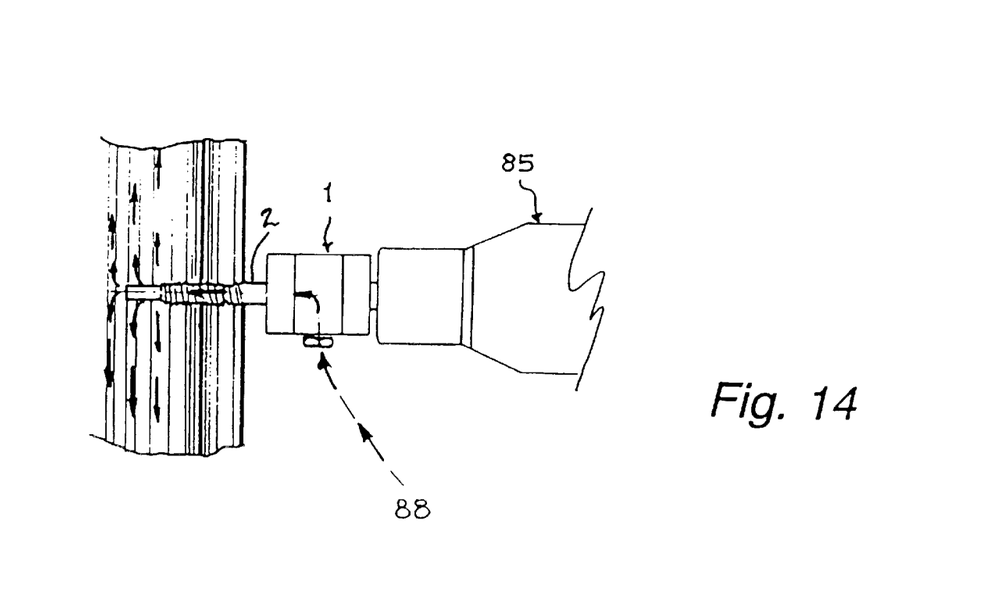

The method of the invention is presented diagrammatically in FIGS. 12 to 18. In FIG. 12, there is shown the step of forming a passage in a plant to which fluid is to be delivered. In this case, the plant is a tree for which the following tissue types are shown; xylem, 81; cambium, 82; phloem 83; and cortex (bark) 84. Apparatus 1 is shown connected to an electric drill 85 and housing 29 into which a drill 86 is fitted. Operation of the drill provides a passage 87 in the tree which can be seen to extend through to the xylem.

Step 2 of the method is depicted in FIG. 13. As shown in the figure, the threaded portion of the apparatus spindle is screwed into passage 87 after removing housing 29 with drill 86 from apparatus 1. Rotary motion is imparted to apparatus 1 by electric drill 85 as generally indicated by the circular arrow.

When the apparatus spindle has been sufficiently seated in passage 87—typically with the end of the spindle screwed into the xylem—rotation of the apparatus is ceased. Fluid is then pumped into the apparatus via fluid delivery line 88 (Step 3 of the method—see FIG. 14). Fluid then enters plant tissue, as generally shown by the arrows, after passing through the passage in the spindle and exiting at the outlet of the passage.

Figure 15:
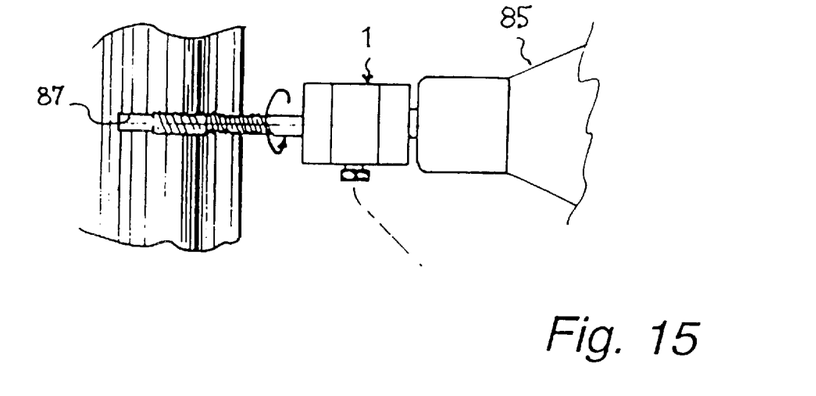

After the desired volume of fluid has been delivered into the plant, apparatus 1 is extracted from passage 87 using drill with the direction of rotation secured as generally shown by the circular arrow in FIG. 15.

Figure 16:
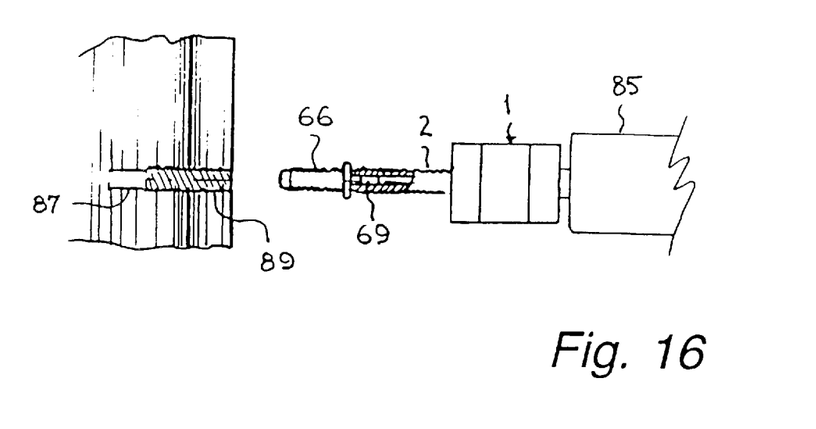
Figure 17:
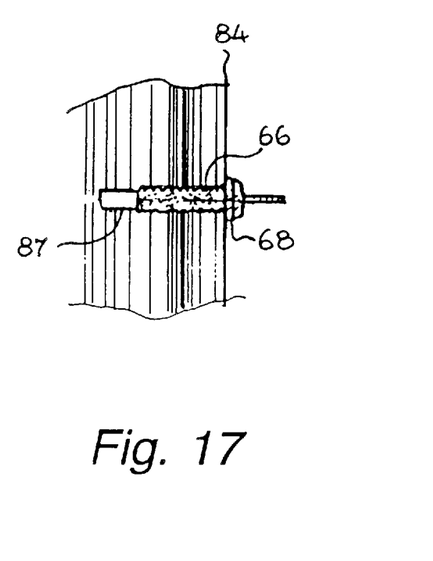
Figure 18:
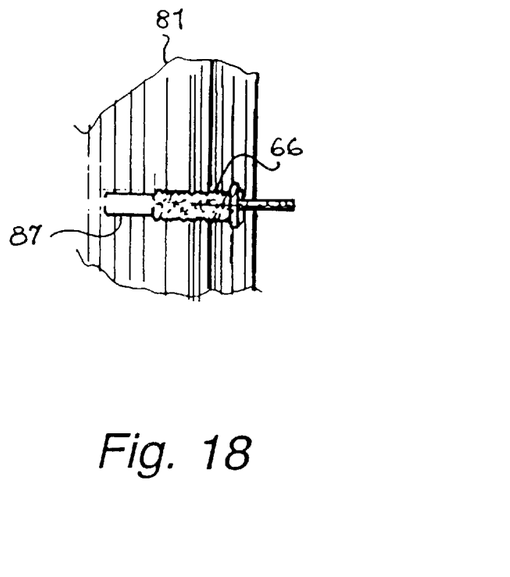

Passage 87 is then preferably plugged as shown in FIGS. 16 to 18. A plug such as plug 66 of FIGS. 10 and 11 is inserted into the end of spindle 2 of apparatus 1. Stem 69 of the plug is fitted into passage 14 of the spindle while web 70 of the plug locates in slot 71 of the spindle (see FIGS. 1, 10 and 11 for detail of the specified items). Plug 66 fitted to spindle 2 is shown in FIG. 16 where portion of spindle 2 is in cross-section to reveal stem 69 of the plug. Rotation of the drill is then used to screw plug 66 into the internal thread 89 previously formed in passage 87 by the apparatus in step 2.

FIG. 17 shows plug 66 in situ in passage 87 where flange 68 has contacted the tree cortex. Insertion of the plug can be continued, however, as shown in FIG. 18. Here, plug 66 has penetrated cortex 84 and extends to xylem 81. This holds the phloem and cambium more securely to the xylem thereby reducing the risk of injection pressure if another delivery site is created nearby. In the absence of the plug, separation of the phloem and cambium could occur on fluid delivery via a nearby passage.

Figure 19:
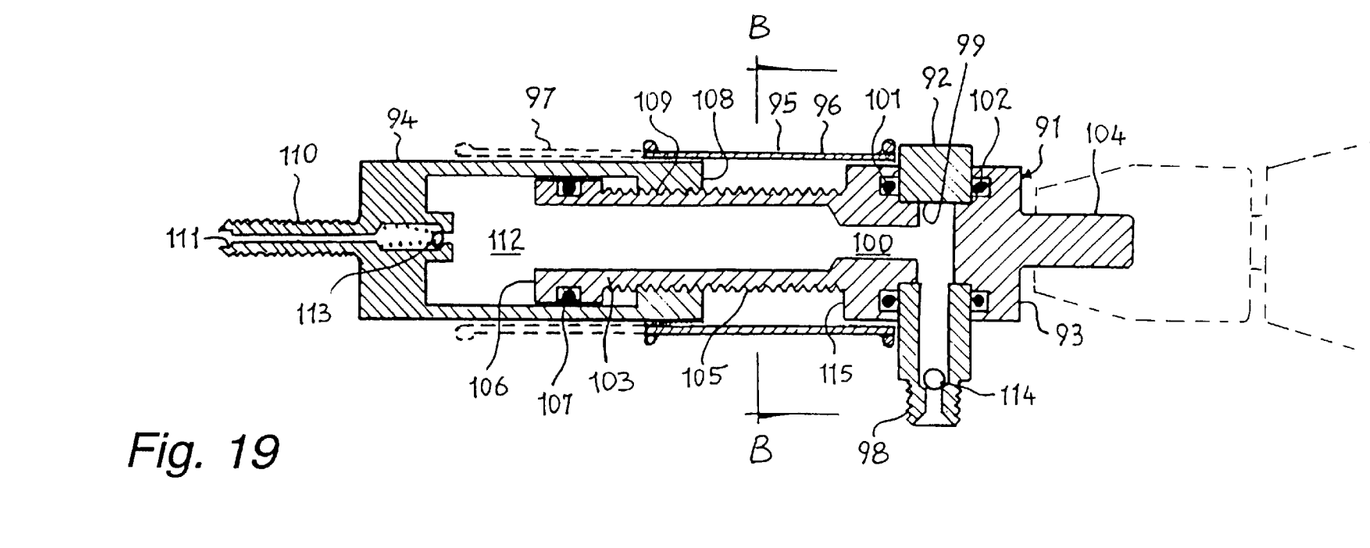
FIG. 19 is a cross-sectional view of yet another apparatus according to the invention.

Referring now to FIG. 19, there is shown a cross-sectional view of an apparatus generally in accordance with the third embodiment of the invention. Apparatus 91 comprises fluid delivery manifold 92, spindle 93, pump barrel 94, and locking means 95 in the form of a sleeve which can be slid between the position 96 shown in the drawing and a position 97 indicated in phantom. Manifold 92 includes an inlet nipple 98 which is coupled via a conduit, not shown in the figure, to a fluid supply source. Other features of the manifold are similar to the manifold of the apparatus shown in FIG. 1, such as channel 100 and O-ring seals 101 and 102.

Spindle 93 has a first end portion 103, and second end portion 104 which is connected to a drive means (in this case an electric drill shown partially in phantom). First end portion 103 includes an externally threaded section 105 and an external flange 106 with as associated O-ring seal 107. Pump barrel 94 has an internal flange 108 which includes an internal thread 109 complementary to thread 105.

Pump barrel 94 has an externally threaded nozzle 110 which has a slot 111 at the end thereof like slot 15 of the apparatus shown in FIG. 1 the bore of nozzle 110 is in fluid communication with the interior 112 of pump barrel 104. A non-return valve 113 in the form of a ball and seat is located within the bore of nozzle 110. A similar non-return valve 114 is located within nipple 98.

Figure 20:
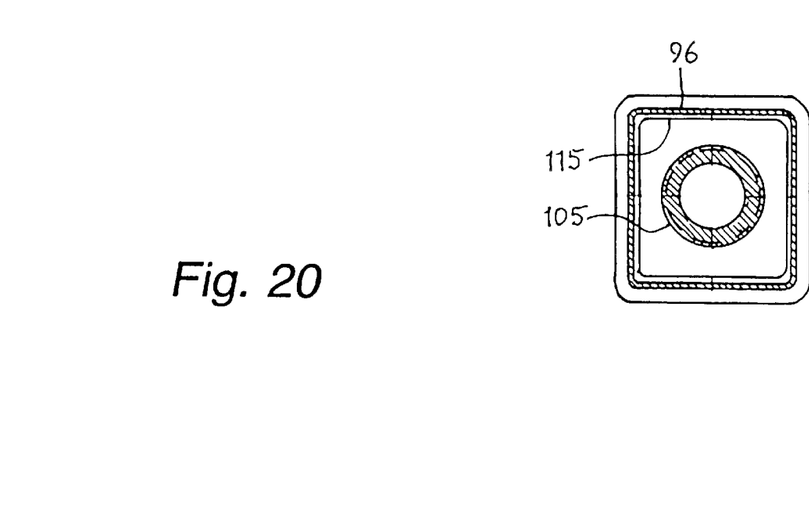
FIG. 20 is a cross-sectional view of the apparatus shown in FIG. 19 at section line B—B of the latter figure.

It will be appreciated that first end portion 103 of spindle 93 is circular in cross-section as are flanges 106 and 108 and the interior of pump barrel 94. However, in this example the external surfaces of the apparatus in at least the pump barrel and locking sleeve regions are square in cross section. This is shown more clearly in FIG. 20 where the threaded section 105 of first end portion 103, sleeve 96 and a boss 115 forming part of fluid delivery manifold 93 can be seen. Nipple 98 has been omitted from the figure.

FIG. 19 depicts how the apparatus according to the third embodiment can function as a "single-shot" fluid delivery device. With sleeve 95 in the unlocked position 97 of FIG. 19. First end portion 103 of spindle 93 is then free to rotate in pump barrel 94. This rotation causes movement of the pump barrel between extended and retracted positions. In moving between the extended and retracted positions, fluid charge in pump barrel 94 is expelled through nozzle 110. Exiting of fluid through nipple 98 is prevented by non-return valve 114. With rotation of the drive means reversed, pump barrel 94 moves to the extended position and in doing so recharges the apparatus with fluid via nipple 98. Ingress of fluid or air via nozzle 110 is prevented by non-return valve 113. With sleeve 96 in the locked position, spindle 93 and pump barrel 94 can be rotated as a single unit.

A method of using apparatus according to the third embodiment is depicted in FIGS. 21 to 25. The same item numbers are used in these figures as used in FIG. 19.

Figure 21:
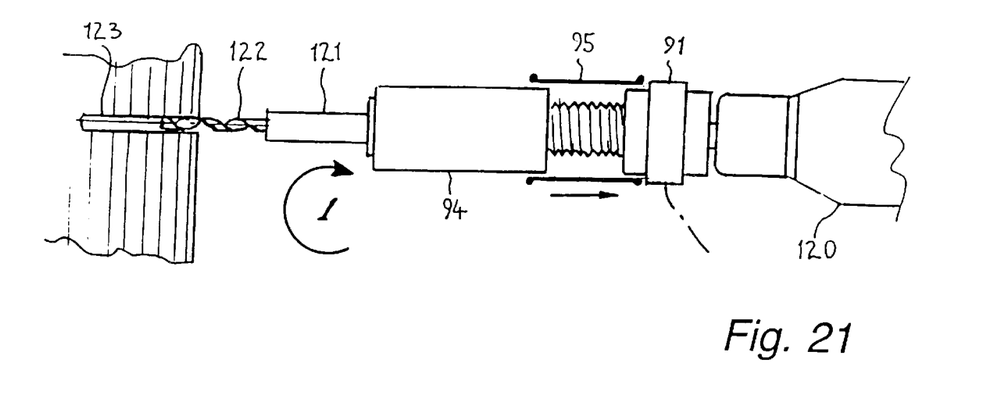
FIGS. 21 to 25 illustrate application of apparatus according to the invention in delivering fluid to tissue of a tree.

Referring to FIG. 21, there is shown the first step in supplying fluid to a plant, in this case a tree. Apparatus 91 is shown connected to a reversible drill 120. The apparatus has a drill-bit holder 121 and drill bit 122 fitted thereto, which holder is similar to the holder exemplified above in FIG. 4. Apparatus 91 is shown with sleeve 95 in the locked position and pump barrel 94 in the extended position. The apparatus has a fluid charge at this stage.

In step 1, apparatus 91 is rotated in the direction generally shown by the arrow whereby drill bit 122 forms a passage 123 in plant tissue. The drill bit is then withdrawn from the plant and the drill bit holder removed from the apparatus.

Figure 22:
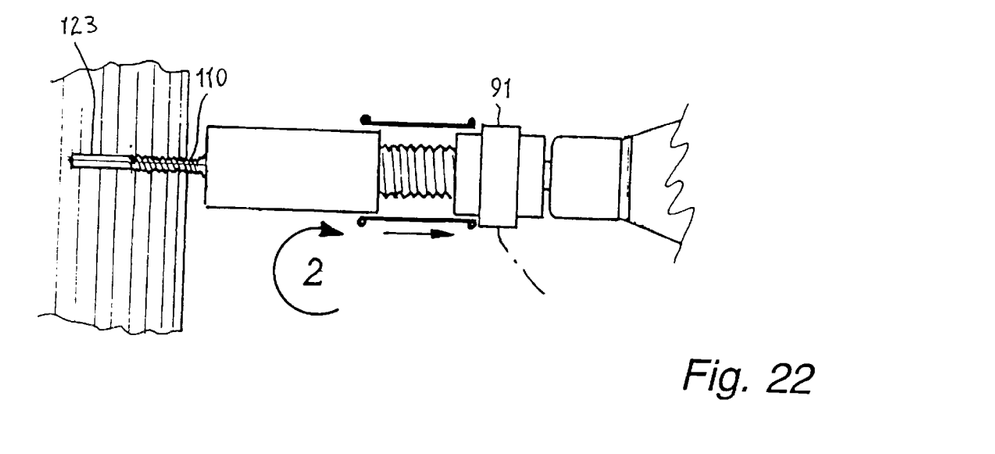

In step 2, FIG. 22, apparatus 91 is rotated in the same direction as in step 1 to effect threaded engagement of nozzle 110 in passage 123.

Figure 23:
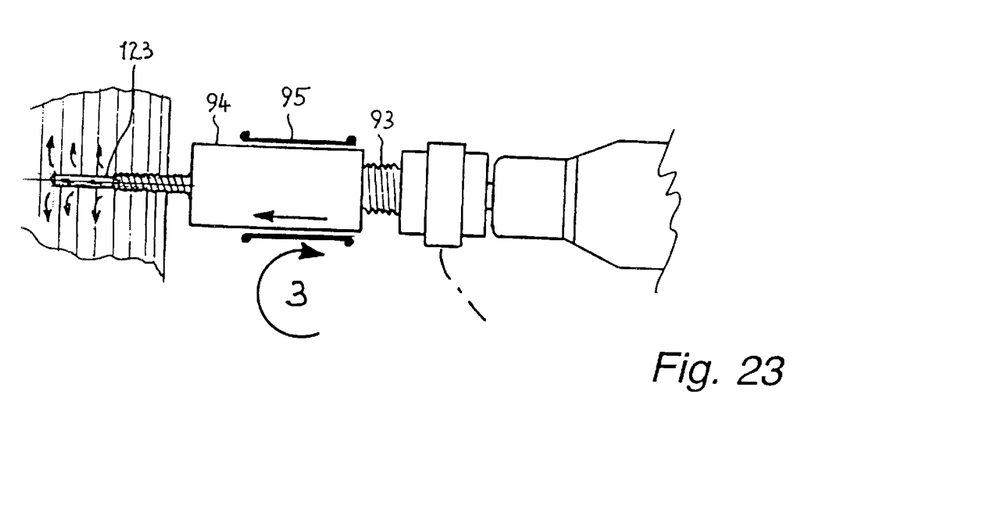

FIG. 23 shows step 3 in which sleeve 96 is moved to the unlocked position so that spindle 93 can rotate in pump barrel 94. Continued rotation of spindle 93 in the same direction as in steps 1 and 2 moves the spindle and pump barrel into the retracted position thereby expelling fluid into the plant tissue as shown generally by the arrows adjacent passage 123.

Figure 24:
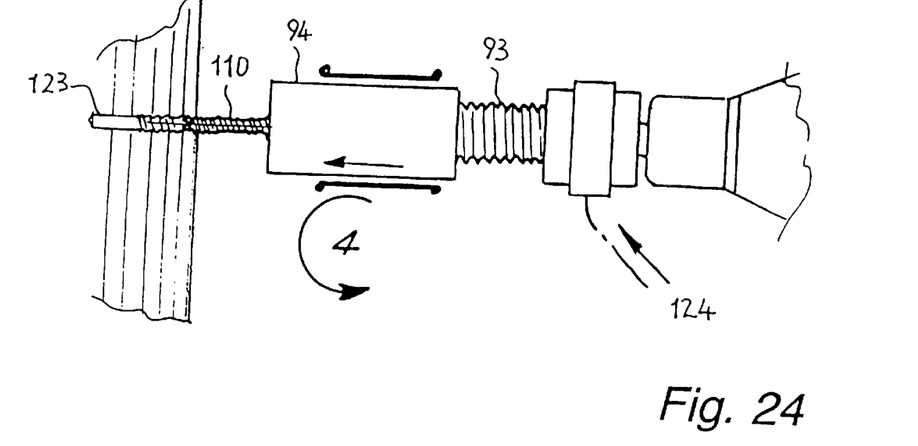

In step 4 depicted FIG. 24, the direction of rotation of the drill is reversed so that spindle 93 moves away from pump barrel 94 which is temporarily retained in the plant by the threaded engagement between nozzle 110 and the walls of passage 123. Once spindle 93 has reached the extended position with respect to the pump barrel 94, the latter begins to rotate thus allowing extraction of nozzle 110 from the plant.

Movement of the spindle during this step also effects recharging of the apparatus with fluid as shown generally by the arrow at 124.

Figure 25:
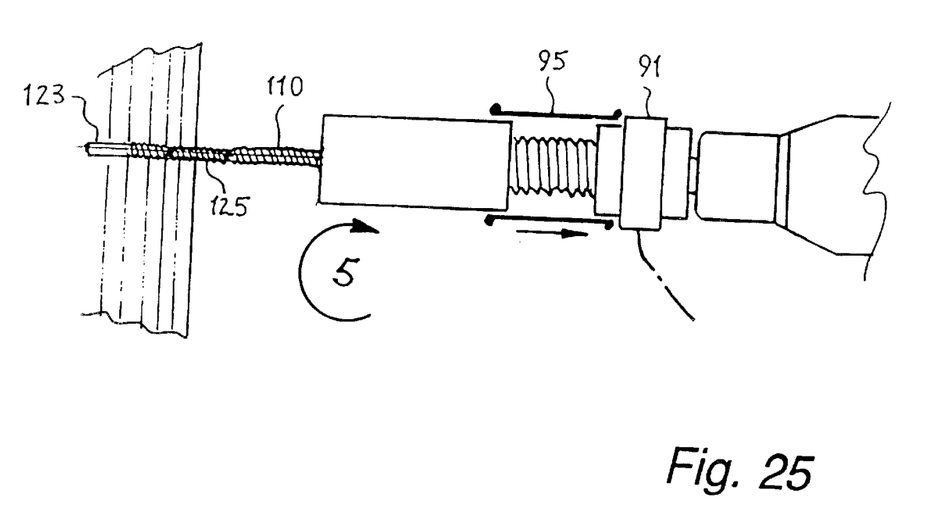

FIG. 25 depicts the optional step of plugging passage 123 in the plant. Sleeve 95 is moved to the locked position which also readies the apparatus for repetition of step 1 (FIG. 21). A plug 125, such as that shown in FIGS. 10 and 11 for example, is fitted into the slot in the end of nozzle 110 (see item 111 of FIG. 19). Rotation of apparatus 91 in the direction indicated at numeral 5 allows the plug to be driven into the pre-threaded passage 123 thereby sealing the passage. Nozzle 110 is then extracted from the end of the plug for repetition of the process as desired.

Figure 26:
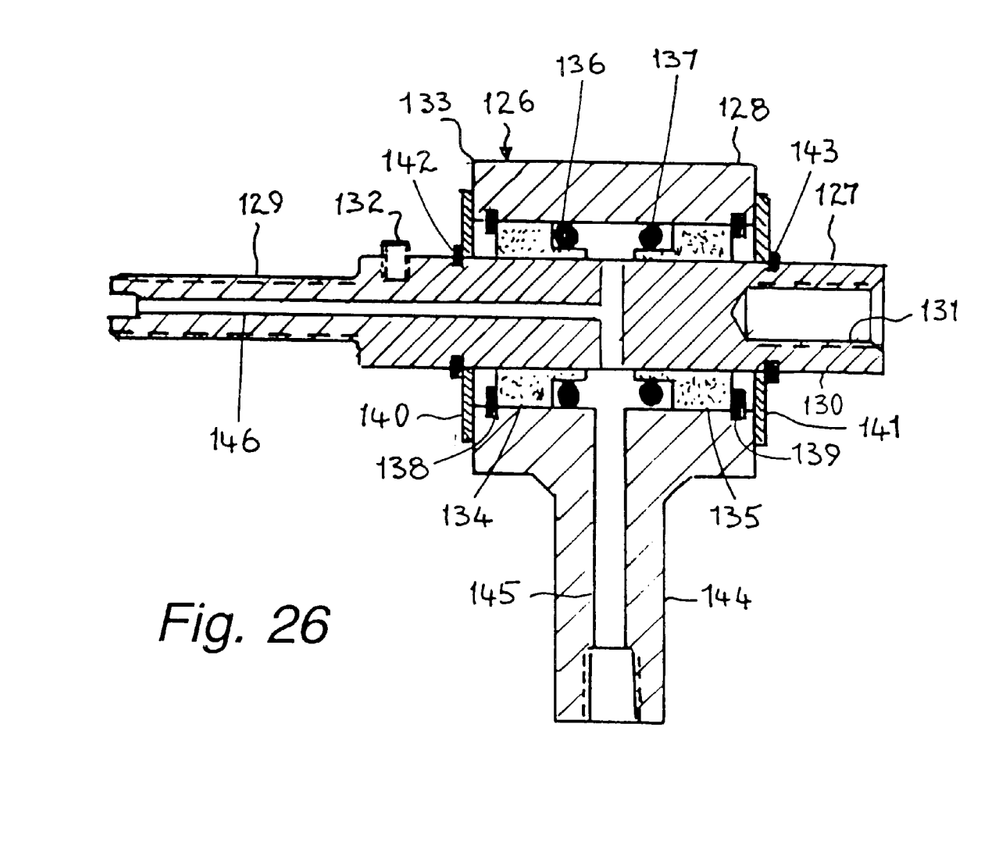
FIG. 26 is a cross-sectional view of yet another apparatus according to the invention.

Another apparatus according to the first embodiment is shown in FIG. 26. Apparatus 126 comprises a spindle 127 and fluid delivery manifold 128. Spindle 127 includes threaded first end portion 129 and second end portion 130. Second end portion 130 includes an internally threaded bore 131 for receiving a threaded shaft of an electric drill or similar drive means. Spindle 127 includes a grub screw 132 which can be used to lock in place an adaptor for a drill bit like the adaptor shown in FIG. 4.

Manifold 128 of apparatus 126 comprises a cylindrical sleeve 133 which is supported by bearings 134 and 135 mounted on spindle 127. Bearings 134 and 135 are fabricated from a low friction plastics material and also act as seals. O-ring seals 136 and 137 are provided in recesses in the bearings, which O-rings ensure a fluid-tight seal between the bearings and sleeve 133. Bearings 134 and 135 are retained by circlips 138 and 139 while sleeve 133 is retained by washers 140 and 141, and circlips 142 and 143. A port 144 extends from sleeve 133 into which port a nipple can be fitted for connection to a fluid supply.

It can be appreciated from FIG. 26 that bearings 134 and 135 are spaced sufficiently apart to form a channel in manifold 128 so that fluid entering the manifold via passage 145 in port 143 can communicate with passage 146 in spindle 127.

Figure 27:
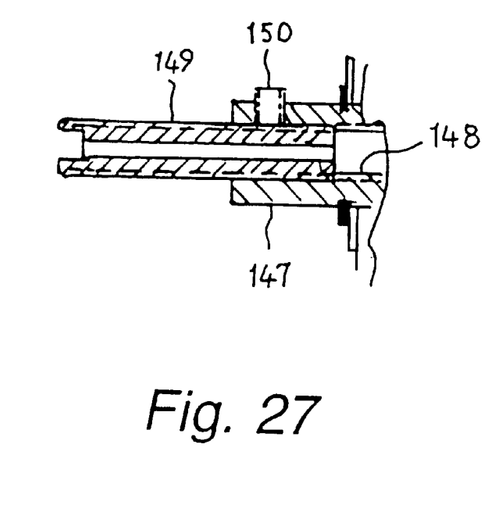
FIG. 27 is a cross-sectional view of portion of an apparatus similar to that shown in FIG. 26.

A variant of the apparatus shown in FIG. 26 is presented in FIG. 27. The latter figure shows portion of spindle 147 which includes a bore 148. Threaded end portion 149 is, in this case, a separate member which is received in an internally threaded portion in bore 148. Threaded end portion 149 can be locked into spindle 147 by tightening grub screw 150 against the former member.

It will be appreciated from FIG. 27 that the exemplified adaptation of the apparatus allows replacement of threaded end portions of spindles which is advantageous if an end portion is damaged.

It will also be appreciated that many changes can be made to the apparatus and methods exemplified above without departing from the broad ambit and scope of the invention.

I claim:

1. An apparatus for pressurized delivery of a fluid into tissue of a plant, said apparatus comprising a spindle rotatable within a fluid delivery manifold positioned between first and second end portions of said spindle, said spindle having an external thread extending from said first end towards said fluid delivery manifold, said fluid delivery manifold including at least one inlet for pressurized fluid, which inlet is in fluid communication with a passage through said spindle and which has at least one outlet in the threaded portion of the spindle or at the first end thereof; wherein said spindle can be rotated by drive means connected to said second end of said spindle for threaded engagement of said first end portion with tissue of said plant in a preformed passage therein to effect a fluid seal between said at least one apparatus passage outlet and the exterior of said plant.

2. Apparatus according to claim 1, wherein said manifold comprises an annulus located in an annular channel formed in said spindle.

3. Apparatus according to claim 2, wherein said annular channel is formed by a stepped boss, a smaller diameter portion thereof which forms the bottom of the channel, and a second annulus locked to the spindle or the smaller diameter portion of the stepped boss to form a second side of said channel.

4. Apparatus according to claim 1, wherein said manifold comprises a cylindrical sleeve supported by two spaced-apart bearings mounted to said spindle.

5. Apparatus according to claim 1, wherein said manifold has fluid-tight seals associated therewith.

6. Apparatus according to claim 1, wherein a channel is provided on an inside surface of said fluid delivery manifold or on an outside surface of said spindle, which channel is in fluid communication with said at least one inlet and said spindle passage.

7. Apparatus according to claim 1, wherein said threaded first end portion is a separate member which is received by a partially threaded bore in said spindle.

8. Apparatus according to claim 1, wherein said threaded first end portion of said spindle has a length of about 3 to 10 cm.

9. Apparatus according to claim 1, wherein said at least one fluid inlet includes a threaded nipple for connection of a conduit thereto.

10. Apparatus according to claim 1, wherein said at least one fluid inlet includes a non-return valve.

11. Apparatus according to claim 1, wherein said fluid delivery manifold includes three fluid inlets.

12. Apparatus according to claim 1 which further includes a brace extending from said manifold to a point where said brace can be fixed to a drive means connected to said second end portion of said spindle.

13. Apparatus according to claim 1, wherein said passage through said spindle has a single axially positioned outlet at said first end of said spindle.

14. Apparatus according to claim 1, wherein said passage through said spindle has two diametrically opposed outlets positioned part-way along said threaded first end portion of said spindle.

15. Apparatus according to claim 14, which further includes an internally threaded ferrule which can be screwed along said threaded first end portion of said spindle.

16. Apparatus according to claim 1, which further includes a removable sleeve fitted over said threaded first end portion of said spindle and locked thereto, wherein the distal end of said sleeve includes an axial recess for receiving a shank of a drill bit or wood borer and means for locking the bit or borer into said recess.

17. A method of delivering a fluid into tissue of a plant, said method comprising the steps of:
1) forming a passage in the trunk or a branch of said plant which extends at least partially into the xylem;
2) driving a rotatable spindle having external threads into said passage to form a threaded engagement between said said external threads of said spindle and plant tissue to effect a fluid seal between the exterior of said plant and a fluid outlet of said spindle that is driven inside said plant;

3) placing said fluid outlet of said spindle in fluid communication with a fluid delivery manifold which manifold has at least one inlet for pressurized fluid;

4) delivering fluid to said plant under pressure via said fluid delivery manifold and said fluid outlet of said spindle; and 5) removing said spindle from said passage in said plant.

18. The method according to claim 17, wherein said spindle is driven into said passage in step (2) and removed from said passage in step (5) using a reversible electric motor connected to a second end of said spindle.

19. The method according to claim 17, wherein said delivery of fluid to the plant under pressure is by a pump connected to said at least one fluid inlet via a conduit.

20. The method according to claim 17, wherein said passage is formed using a drill bit or wood borer connected via a removable sleeve fitted over said threaded spindle and locked thereto, said sleeve including an axial recess for receiving a shank of the bit or borer and and comprising the further step of locking the bit or borer into said recess.

21. The method according to claim 17 which includes the further step of plugging said passage in said plant.

22. The method according to claim 21, wherein said plugging is by a plug comprising an elongate cylindrical member having at least one chamfered end.

23. The method according to claim 22, wherein said plug has one externally flanged end.

24. The method according to claim 22, wherein said plug has a plurality of annular barbs along the length thereof.

25. The method according to claim 22, wherein said plug has an external thread corresponding to said spindle thread.

26. The method according to claim 25, wherein said plug further includes an axial stem at an end thereof which stem can be held as a transitional fit in a recess provided in said spindle.

27. The method according to claim 26, wherein said plug further includes a diametric web at the end of said plug contiguous with said stem, which web can be received in a slot provided in the end of said spindle.

28. An apparatus for pressurized delivery of a fluid into tissue of a plant, said apparatus comprising:

a spindle rotatable within a fluid delivery manifold positioned between first and second end portions of said spindle;

a pump barrel which threadingly engages said spindle first end and is axially movable with respect thereto between retracted and extended positions, said pump barrel having an externally threaded spout the axis of which is aligned with the axis of said spindle, said spout having associated therewith a valve which prevents back flow of fluid into said pump barrel;

a lock for retaining said pump barrel in said extended position and preventing movement of said pump barrel with respect to said spindle first end; and at least one fluid inlet in said fluid delivery manifold which is in fluid communication with the interior of said pump barrel via a passage through said spindle, said at least one fluid inlet having associated therewith a valve for preventing back flow of fluid from said fluid delivery manifold;

wherein, said spindle can be rotated by drive means connected to said second end of said spindle for threaded engagement of said spout with tissue of said plant in a preformed passage therein to effect a fluid seal between said spout outlet and the exterior of said plant.

29. Apparatus according to claim 28, wherein said spindle first end is threadingly engaged within said pump barrel.

30. Apparatus according to claim 29, wherein:

said threaded engagement of said spindle first end within said pump barrel is via an internally-threaded internal flange at or adjacent the end of said pump barrel opposite the spout end;

said spindle first end has an external flange to prevent separation of said barrel and spindle; and said external flange includes on O-ring which contacts the inside surfaces of said pump barrel.

31. Apparatus according to claim 28, wherein said lock is a slip-ring or sleeve which can be moved between a position which effects locking between said pump barrel and spindle and a position which allows independent rotation of said pump barrel and spindle.

32. Apparatus according to claim 28, wherein said manifold comprises an annulus located in an annular channel formed in said spindle.

33. Apparatus according to claim 28, wherein said manifold has fluid-tight seals associated therewith.

34. Apparatus according to claim 28, wherein a channel is provided on an inside surface of said fluid delivery manifold or on an outside surface of said spindle, which channel is in fluid communication with said at least one inlet and said spindle passage.

35. Apparatus according to claim 28, wherein said threaded first end portion of said spindle has a length of about 3 to 10 cm.

36. Apparatus according to claim 28, wherein said at least one fluid inlet includes a threaded nipple for connection of a conduit thereto.

37. Apparatus according to claim 28, wherein said spout has a single axially positioned outlet.

38. Apparatus according to claim 37, wherein said spout has two diametrically opposed outlets positioned part-way along said spout.

39. Apparatus according to claim 38, which further includes an internally threaded ferrule which can be screwed along said spout.

40. Apparatus according to claim 28, which further includes a removable sleeve fitted over said spout and locked thereto, wherein the distal end of said sleeve includes an axial recess for receiving a shank of a drill bit or wood borer and means for locking the bit or borer into said recess.

41. A method of delivering a fluid into tissue of a plant, said method comprising the steps of:

(1) forming a passage in the trunk or branch of said plant which extends at least partially into the xylem;

(2) driving an apparatus into said passage with threaded engagement between said pump barrel spout and plant tissue to effect a fluid seal between said spout outlet and the exterior of said plant, wherein said pump barrel is in said extended position and is charged with fluid; wherein said apparatus comprising:

a spindle rotatable within a fluid delivery manifold positioned between first and second end portions of said spindle;

a pump barrel which threadingly engages said spindle first end and is axially movable with respect thereto between retracted and extended positions said pump barrel having an externally threaded spout the axis of which is aligned with the axis of said spindle, said spout having associated therewith a valve which prevents back flow of fluid into said pump barrel;

a lock for retaining said pump barrel in said extended position and preventing movement of said pump barrel with respect to said spindle first end; and at least one fluid inlet in said fluid delivery manifold which is in fluid communication with the interior of said pump barrel via a passage through said spindle, said at least one fluid inlet having associated therewith a valve for preventing back flow of fluid from said fluid delivery manifold;

wherein, said spindle can be rotated by drive means connected to said second end of said spindle for threaded engagement of said spout with tissue of said plant in a preformed passage therein to effect a fluid seal between said spout outlet and the exterior of said plant;

(3) delivering fluid to said plant under pressure by moving said pump barrel to said retracted position via rotation of said spindle; and (4) removing said apparatus from said passage in said plant.

42. The method according to claim 41, wherein said apparatus is driven into said passage in step (2) and removed from said passage in step (4) using a reversible electric motor connected to said second end of said spindle.

43. The method according to claim 41, wherein said passage is formed using a drill bit or wood borer connected to said apparatus via a removable sleeve fitted over said spout and locked thereto, said sleeve including an axial recess for receiving a shank of the bit or borer and means for locking the bit or borer into said recess.

44. The method according to claim 41, which includes the further step of plugging said passage in said plant.

45. The method according to claim 41, wherein said plugging is by a plug comprising an elongate cylindrical member having at least one chamfered end.

46. The method according to claim 45, wherein said plug has one externally flanged end.

47. The method according to claim 45, wherein said plug has a plurality of annular barbs along the length therein.

48. The method according to claim 45, wherein said plug has an external thread corresponding to said spout thread of said apparatus.

49. The method according to claim 48, wherein said plug further includes an axial stem at an end thereof which stem can be held as a transitional fit in a recess provided in said apparatus spout.

50. The method according to claim 49, wherein said plug further includes a diametric web at the end of said plug contiguous with said stem, which web can be received in a slot provided in the end of said apparatus spout.

* * * * *